US008443675B2

(12) United States Patent
Kasai

(10) Patent No.: US 8,443,675 B2
(45) Date of Patent: May 21, 2013

(54) DUAL PHYSICAL QUANTITY SENSOR

(75) Inventor: Akio Kasai, Tokyo (JP)

(73) Assignee: Azbil Corporation, Tokyo (JP)

( * ) Notice: Subject to any disclaimer, the term of this patent is extended or adjusted under 35 U.S.C. 154(b) by 164 days.

(21) Appl. No.: 13/154,925

(22) Filed: Jun. 7, 2011

(65) Prior Publication Data

US 2011/0308321 A1    Dec. 22, 2011

(30) Foreign Application Priority Data

Jun. 17, 2010    (JP) ................................. 2010-138333

(51) Int. Cl.
*G01L 13/02*    (2006.01)
*G01L 15/00*    (2006.01)

(52) U.S. Cl.
USPC .................... 73/708; 73/714; 73/716; 73/736

(58) Field of Classification Search ........................ None
See application file for complete search history.

(56) References Cited

U.S. PATENT DOCUMENTS

| | | | |
|---|---|---|---|
| 6,708,560 B2 * | 3/2004 | Watanabe et al. .......... | 73/204.22 |
| 7,980,137 B2 | 7/2011 | Ohtani et al. | |
| 2010/0011856 A1 * | 1/2010 | Nagata ....................... | 73/504.12 |
| 2010/0066423 A1 * | 3/2010 | Inukai et al. ................. | 327/163 |
| 2010/0169028 A1 * | 7/2010 | Shiraki et al. ................... | 702/56 |
| 2010/0289480 A1 * | 11/2010 | Soramoto et al. ............... | 324/85 |
| 2011/0313704 A1 * | 12/2011 | Sasaki .......................... | 702/100 |

FOREIGN PATENT DOCUMENTS

| | | |
|---|---|---|
| JP | 2009-31003 A | 2/2009 |
| JP | 2009-115302 A | 5/2009 |
| KR | 100682941 | 2/2007 |

OTHER PUBLICATIONS

Korean Office Action, dated Sep. 24, 2012, which issued during the prosecution of Korean Patent Application No. 10-2011-0057490.

* cited by examiner

*Primary Examiner* — Andre Allen
(74) *Attorney, Agent, or Firm* — Troutman Sanders LLP

(57) ABSTRACT

A pressure sensor for detecting a pressure of a first object to be measured; a pressure sensor for detecting a pressure of a second object to be measured; a temperature sensor for detecting the temperature of the pressure sensor and the pressure sensor; a first correcting portion for executing a correction that eliminates a fluctuation portion, due to a change in temperature, from the detection signal of the pressure sensor, and for outputting the signal, after the correction, as a measurement signal for the first object to be measured; and a second correcting portion for executing a correction that eliminates a fluctuation portion, due to a change in temperature, from the detection signal of the pressure sensor, and for outputting the signal, after the correction, as a measurement signal for the second object to be measured; wherein the temperature sensor is integrated with the pressure sensor and the pressure sensor so as to be in a state of mutual contact.

5 Claims, 6 Drawing Sheets

DUAL PHYSICAL QUANTITY SENSOR

CROSS REFERENCE TO RELATED APPLICATIONS

The present application claims priority under 35 U.S.C. §119 to Japanese Patent Application No. 2010-138333, filed Jun. 17, 2010, which is incorporated herein by reference.

FIELD OF TECHNOLOGY

The present invention relates to a dual physical quantity sensor.

BACKGROUND OF THE INVENTION

Japanese Unexamined Patent Application Publication 2009-31003 ("JP '003"), below, discloses a dual pressure sensor for detecting pressures, of that which is to be measured, with each of two pressure sensors. The dual pressure sensor as set forth in JP '003 can be installed in, for example, a valve unit of a flow control valve as set forth in Japanese Unexamined Patent Application Publication 2009-115302, below. In this case, the dual pressure sensor detects both the fluid pressures on the upstream side of the valve unit and on the downstream side of the valve unit, and outputs to a flow measuring device for controlling the flow control valve. The flow measuring device calculates the flow of the fluid flowing within a flow path of the flow controlling valve based on the differential pressure between the fluid pressure on the upstream side and the fluid pressure on the downstream side.

Note that this pressure sensor has a temperature characteristic wherein the output value will fluctuate with the temperature at the time of use. In order to calculate the flow of the fluid accurately when using a pressure sensor having this type of temperature characteristic, it is necessary to perform accurate temperature correction on the output value of the pressure sensor to eliminate from the output value the fluctuation portion due to temperature variation. Because of this, in JP '003, a temperature sensor is provided in each of the two pressure sensors, and the temperature detected by the temperature sensor is used to correct the values detected by each of the pressure sensors.

Because it is necessary to provide two temperature sensors for the one dual pressure sensor in the dual pressure sensor in JP '003, described above, it has been difficult to respond to demands for reduced parts counts and costs.

Given this, the object of the present invention is to provide a dual physical quantity sensor wherein it is possible to reduce parts counts and costs.

SUMMARY OF THE INVENTION

The dual physical quantity sensor as set forth includes a first physical quantity detecting element for detecting a physical quantity of a first object to be measured; a second physical quantity detecting element for detecting a physical quantity of a second object to be measured; a temperature detecting element for detecting the temperature of the first physical quantity detecting element and the second physical quantity detecting element; a first correcting portion for performing a correction that eliminates, from a detection signal from the first physical quantity detecting element, a fluctuation portion due to a change in temperature, to output a corrected signal as a measurement signal for the first object to be measured; and a second correcting portion for performing a correction that eliminates, from a detection signal from the second physical quantity detecting element, a fluctuation portion due to a change in temperature, to output a corrected signal as a measurement signal for the second object to be measured; wherein: the temperature detecting element is integrated in a state that is in mutual contact with the first physical quantity detecting element and the second physical quantity detecting element.

This structure enables the integration of a single temperature detecting element in a state that is in mutual contact with the first physical quantity detecting element and the second physical quantity detecting element, thus enabling detection of the temperature of the first physical quantity detecting element and the second physical quantity detecting element using a single temperature detecting element.

In the aforementioned dual physical quantity sensor, a heat-generating device may further be provided to cause the temperatures of the first physical quantity detecting element and of the second physical quantity detecting element to be identical.

Doing so enables an increase in the temperature of the first physical quantity detecting element and of the second physical quantity detecting element, to a level that is able to exclude the influence of temperature variations, through heating the heat-generating device, even when there is variation in the ambient temperature of the material being measured or of the dual physical quantity sensor, enabling an improvement in the detection accuracy of the physical quantity.

In the dual physical quantity sensor set forth above, a heat generation controlling portion for controlling the amount of heat generated by the heat generating device may further be provided so as to cause the detection temperature of the temperature detecting element to go to a specific temperature that has been set in advance.

Doing so enables control of the amount of heat generated by the heat generating device so as to not to increase to a temperature that would damage the first physical quantity detecting element or the second physical quantity detecting element.

The present invention is able to provide a dual physical quantity sensor able to reduce parts counts and costs.

DETAILED DESCRIPTION OF THE PRESENT INVENTION

An example according to the present invention is explained below. In the descriptions of the drawings below, identical or similar components are indicated by identical or similar codes. Note that the diagrams are schematic. Consequently, specific measurements should be evaluated in light of the descriptions below. Furthermore, even within these drawings there may be portions having differing dimensional relationships and proportions.

In the present example, the explanation is for, for example, a dual pressure sensor that has two pressure sensors, as a dual physical quantity sensor. Note that the physical quantity is not limited to pressure, and application can be made similarly to other physical quantities.

Figure 1:
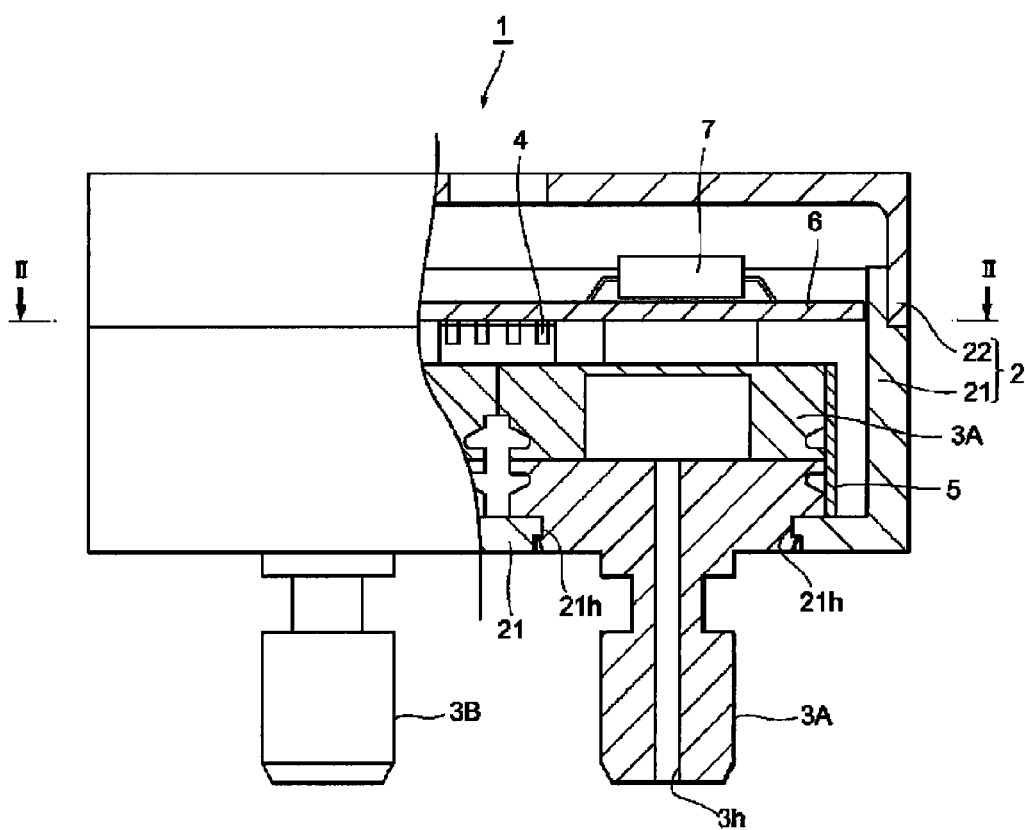
FIG. 1 is a partial side cross-sectional diagram of a dual pressure sensor according to an example.
Figure 2:
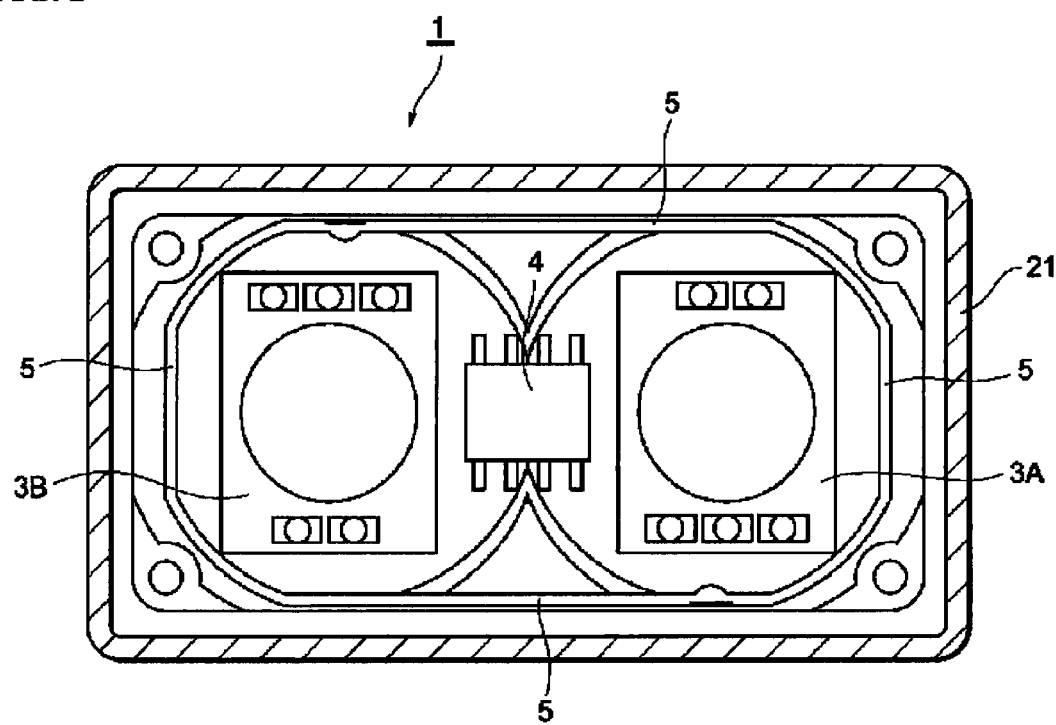
FIG. 2 is a cross-sectional diagram viewed in the direction of the arrow in the line II-II in FIG. 1.

FIG. 1 is a partial side cross-sectional diagram of a dual pressure sensor according to an example and FIG. 2 is a cross-sectional diagram viewed in the direction of the arrow in the line II-II in FIG. 1. The dual pressure sensor 1 has an airtight container 2; two pressure sensors 3A and 3B; a temperature sensor 4; a heater 5; a substrate 6; and a controlling circuit 7.

The airtight container 2 has a container main unit 21 and a lid unit 22, made from synthetic plastic, or the like. In the description below, in the airtight container 2, the side with the lid unit 22 is defined as upward and the side with the container main unit 21 is defined as downward. The container main unit 21 is a container having a box shape, with a bottom, that is open in the upward direction. Insertion holes 21h, corresponding to the two pressure sensors 3A and 3B, are each formed in the bottom plate of the container main unit 21. The lid unit 22 is secured through screws, through a seal member (not shown) at the top surface of the container main unit 21, to seal the opening portion of the container main unit 21 airtightly.

The two pressure sensor 3A and 3B are disposed lined up in intimate contact with each other within the container main unit 21, where the temperature sensor 4 is provided on the top surfaces of these pressure sensors 3A and 3B. The pressure sensors 3A and 3B and the temperature sensor 4 are integrated together in a state each is in contact with each other. In this way, the two pressure sensors 3A and 3B being caused to be in intimate contact with each other makes it possible to avoid the occurrence of a temperature differential between the pressure sensors 3A and 3B.

The pressure sensors 3A and 3B detect the respective pressures of the object being measured, which is drawn in through respective introducing holes 3h. A fluid, such as water, a gas, or the like, can be applied as the object being measured. For the pressure sensors 3A and 3B, a well-known semiconductor pressure sensor having, for example, a semiconductor substrate (silicon) wherein a diagram (a thin pressure-sensitive portion), and a diffusion-type deformation gauge that is formed through an impurity in a semiconductor substrate or through an ion implantation technology may be used. The diffusion-type strain gauge uses the piezoresistive effect to detect, and convert into an electric signal, a strain in a diaphragm due to the pressure being measured. The pressure sensors 3A and 3B have the thermal characteristic of the output gain and offset varying with the use temperature.

The temperature sensor 4 detects the temperature of the pressure sensors 3A and 3B. The heater 5 heats the surroundings of the pressure sensors 3A and 3B uniformly to a specific temperature that is set in advance. The specific temperature preferably is set to a temperature that is slightly higher than the upper limit of the temperature range that can be assumed by the object being measured. For example, if the temperature range that can be assumed by the object being measured is between 7° C. and 65° C., then it may be set to between about 70° C. and 75° C., which is slightly higher than the 65° C. that is the upper limit. Doing so makes it possible to increase the temperature of the pressure sensors 3A and 3B to a level wherein the influence of temperature variations can be eliminated, through the heater 5, even if there are variations in the ambient temperature of the object being measured and of the dual pressure sensors due to variations in temperature of the outside air, thus making it possible to suppress a state wherein a temperature difference would be produced between the pressure sensors 3A and 3B. This makes it possible to improve the accuracy with which the pressure values are detected.

The controlling circuit 7 provided on the substrate 6, and controls the operation of each part of the dual pressure sensor 1. The controlling circuit 7 achieves each of the functions of the dual pressure sensor 1, described below. The functional structure of the dual pressure sensor 1 in an example is explained in reference to FIG. 3.

Figure 3:
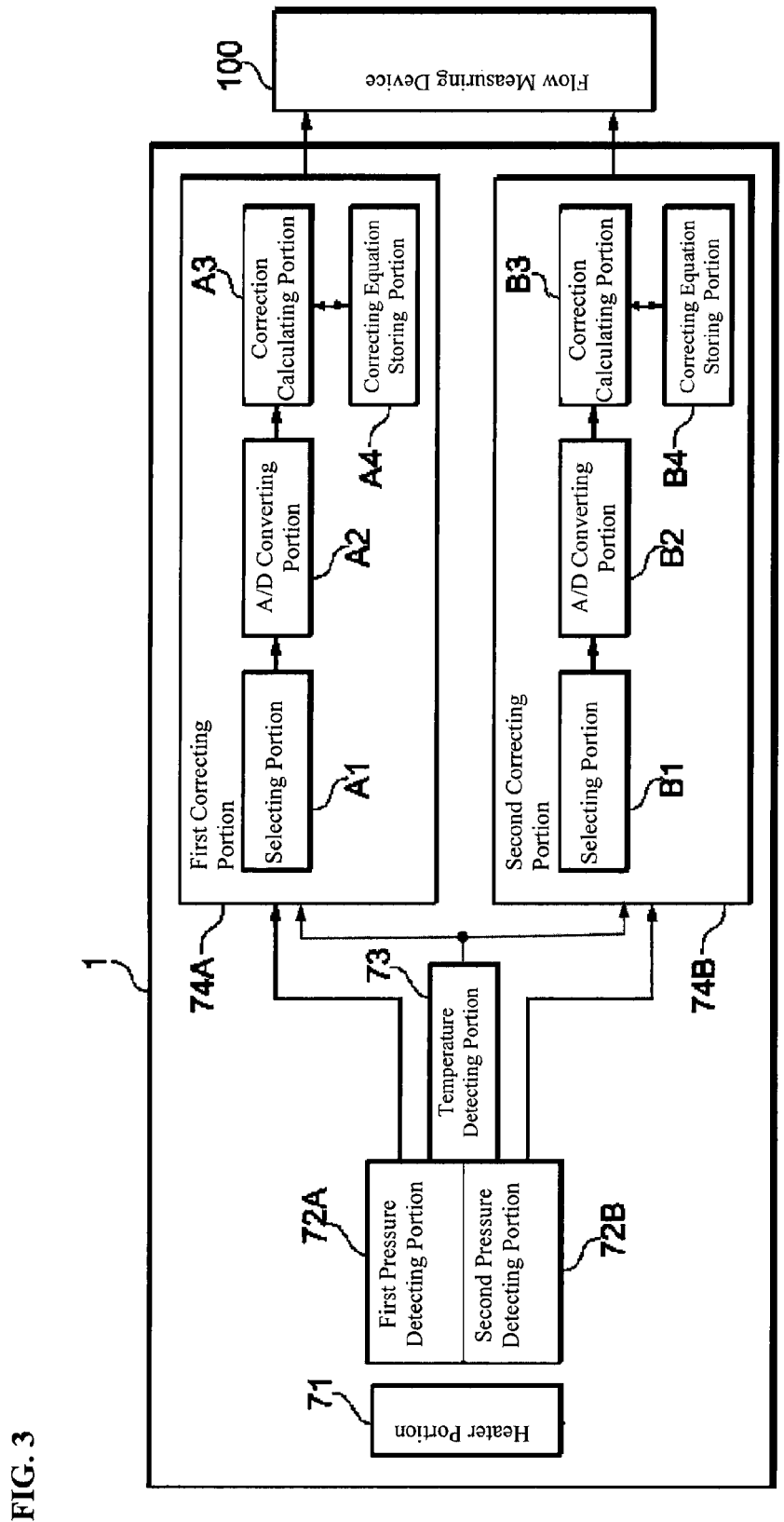
FIG. 3 is a functional structural diagram of the dual pressure sensor according to the example.

As illustrated in FIG. 3, the dual pressure sensor 1 includes a heater portion 71, a first pressure detecting portion 72A, a second pressure detecting portion 72B, a temperature detecting portion 73, a first correcting portion 74A, and a second correcting portion 74B. Note that FIG. 3 illustrates an example of a structure of a case wherein a flow rate measuring device 100 for measuring the flow rate of a fluid is equipped in the backstage of the dual pressure sensor 1.

The heater portion 71 drives the heater 5 to heat the pressure sensors 3A and 3B to the specific temperature that is set in advance.

The first pressure detecting portion 72A obtains a detection signal from the pressure sensor 3A, and outputs the obtained detection signal to the first correcting portion 74A. The second pressure detecting portion 72B obtains a detection signal from the pressure sensor 3B, and outputs the obtained detection signal to the second correcting portion 74B.

The temperature detecting portion 73 obtains the detected temperature from the temperature sensor 4, and outputs the obtained detected temperature to the first correcting portion 74A and the second correcting portion 74B.

The first correcting portion 74A corrects the detection signal obtained from the first pressure detecting portion 72A based on the detected temperature obtained from the temperature detecting portion 73, and outputs the signal, after correction, to the flow rate measuring device 100 as a first measurement signal. The second correcting portion 74B corrects the detection signal that was obtained from the second pressure detecting portion 72B, based on the detected temperature obtained from the temperature detecting portion 73, and outputs the signal after correction to the flow rate measuring device 100 as a second measurement signal.

The first correcting portion 74A and the second correcting portion 74B each have respective selecting portions A1 and B1, A/D converting portions A2 and B2, correction calculating portions A3 and B3, and correcting equation storing portions A4 and B4. The selecting portions A1 and B1 are, for example, multiplexers, and receive respective signals from the first pressure detecting portion 72A and the second pressure detecting portion 72B, and the temperature detecting portion 73, and select one of the signals to output to the A/D converting portions A2 and B2.

The A/D converting portions A2 and B2 convert the analog signals received from the selecting portions A1 and B1 into digital signals, and output them to the correction calculating portions A3 and B3. The correction calculating portions A3 and B3 perform correcting processes, using correcting equations that are stored in the correcting equation storing portions A4 and B4, on the pressure values corresponding to the digital signals received from the A/D converting portions A2 and B2, and output signals corresponding to the pressure values after the correcting processes, as measurement signals, to the flow rate measuring device 100. The correcting equation may use, for example, a linear equation, a quadratic equation, or the like, that uses temperature as a variable. For the correcting equation, the fluctuation of the pressure value due to variation in temperature is calculated from reference values for each temperature by performing, for example, experiments in advance, in order to prepare an equation that is able to eliminate the fluctuation portion, the detection signal. That is, the correcting process is a process for correcting to eliminate the fluctuation portion, due to temperature variations, from the detection signal from the first pressure detecting portion 72A or the second pressure detecting portion 72B.

The flow rate measuring device 100 calculates a pressure differential between the pressure sensors 3A and 3B by calculating the difference between the first measurement signal, outputted from the first correcting portion 74A, and the second measurement signal, outputted from the second correcting portion 7B. Using, as an example, the case wherein the dual pressure sensor 1 is installed in a valve main unit of a flow rate control valve, the differential pressure can be used as described below. Note that in this case, the pressure sensor 3A and the pressure sensor 3B are disposed so as to be able to measure the fluid pressure on the upstream side of the valve unit and the fluid pressure on the downstream side of the valve unit, respectively.

The flow rate Q of the fluid that flows in a flow path of the flow rate control valve can be calculated through Equation (1), below, using the pressure difference $\Delta P$ in the fluid between the upstream-side flow path and the downstream-side flow path of the valve unit, and a flow rate coefficient (the Cv value) produced by the degree of opening of the valve unit. Note that A in Equation (1), below, is a constant.

$$Q = A * Cv * \sqrt{\Delta P} \ldots \quad (1)$$

That is, the flow rate Q of the fluid can be calculated by substituting, into $\Delta P$ in Equation (1), above, the differential pressure calculated by the flow rate measuring device 100, enabling the degree of opening of the valve unit to be controlled in accordance with the flow rate Q.

When the dual pressure sensor 1 is installed in a flow rate control valve, the dual pressure sensor 1 and flow rate measuring device 100 operate as described below, for example.

First, when the pressure being measured on the upstream side of the valve unit acts on the diaphragm of the pressure sensor 3A, and the pressure being measured on the downstream side of the valve unit acts on the diaphragm of the pressure sensor 3B, the diaphragms of individual pressure sensors 3A and 3B undergo strain in accordance with the pressures that act thereon, where the output voltage of the diffusion-type strain gauge varies with this strain.

Following this, the first pressure detecting portion 72A and second pressure detecting portion 72B measure the respective pressures based on the change in the output voltages, and output the measurement results, as detection signals, to the first correcting portion 74A and the second correcting portion 74B. In this case, the pressure within the airtight container 2 acts on the diaphragm as a reference pressure, and thus the output voltages from the individual pressure sensors 3A and 3B are output voltages for absolute pressures, corresponding to the respective pressures being measured.

Following this, the first correcting portion 74A and the second correcting portion 74B use of the detection temperature obtained from the temperature detecting portion 73, to execute the respective correction processes on the pressure values corresponding to the detection signals, and output the results thereof to the flow rate measurement device 100 as measurement signals.

Following this, the flow rate measuring device 100 calculates the pressure differential $\Delta P$, using the pressure values that correspond to the respective measurement signals that have been received from the dual pressure sensor 1, and performs a calculation by substituting the calculated differential pressure $\Delta P$ into Equation (1), above, to calculate the flow rate Q of the fluid that flows through the flow rate control valve.

As described above, the dual pressure sensor in the example enables the integration of the temperature sensor 4 and the pressure sensors 3A and 3B in a state wherein they are in contact with each other, thus making it possible to detect the temperatures of the pressure sensors 3A and 3B using a single temperature sensor 4.

While the present invention was explained using the example set forth above, the description and drawings that form a portion of this disclosure do not limit the present invention. A variety of alternate examples and operating technologies should be obvious to those skilled in the art.

Figure 4:
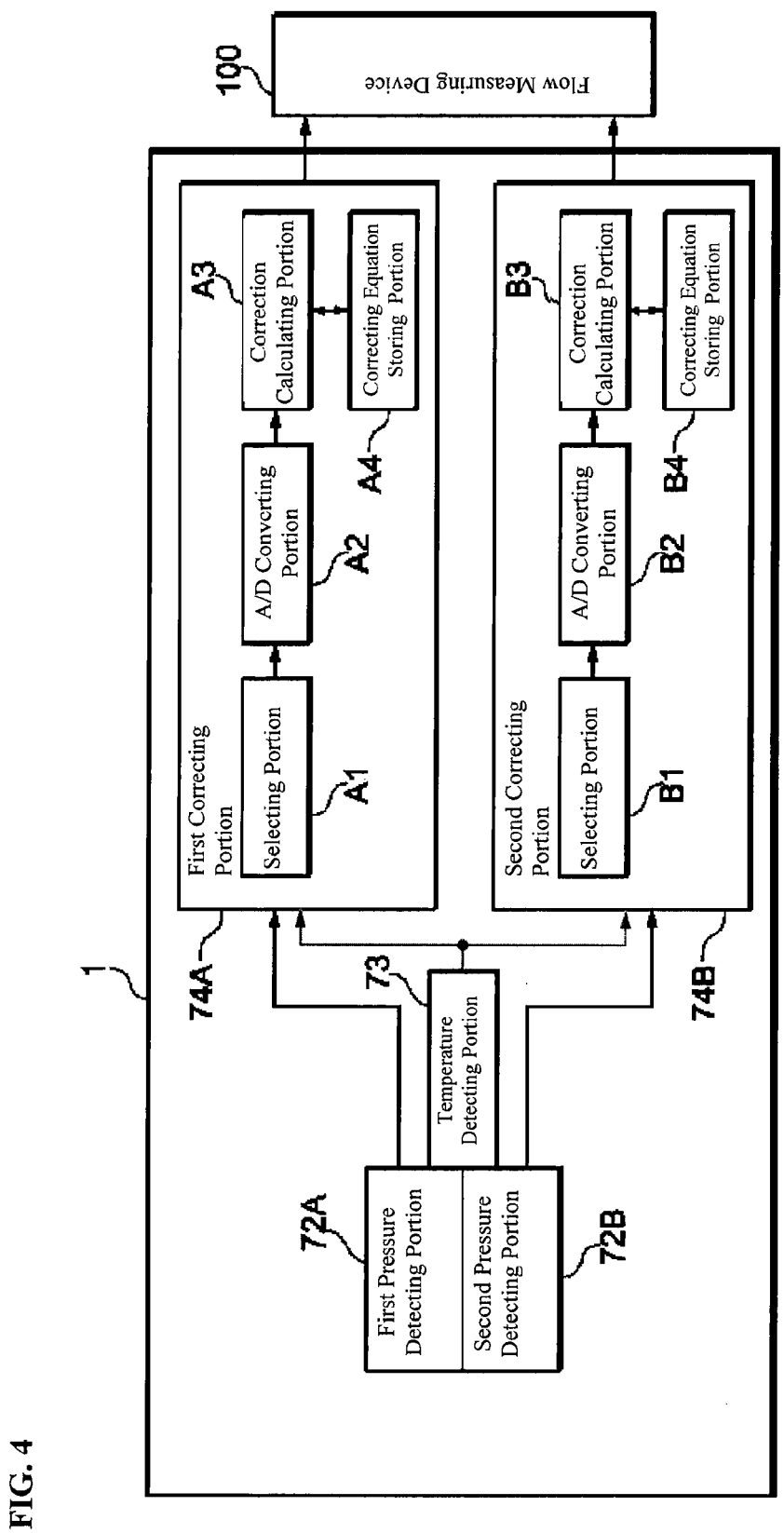
FIG. 4 is a functional structural diagram of the dual pressure sensor according to a modified example.

For example, while in the example set forth above a heater 5 was provided, the heater 5 may be omitted instead. The functional structure of the dual pressure sensor 1 in this example is illustrated in FIG. 4. As illustrated in FIG. 4, the dual pressure sensor 1 differs from the dual pressure sensor 1 in the example set forth above in the point that the heater portion 71 in FIG. 3 is not included.

Figure 5:
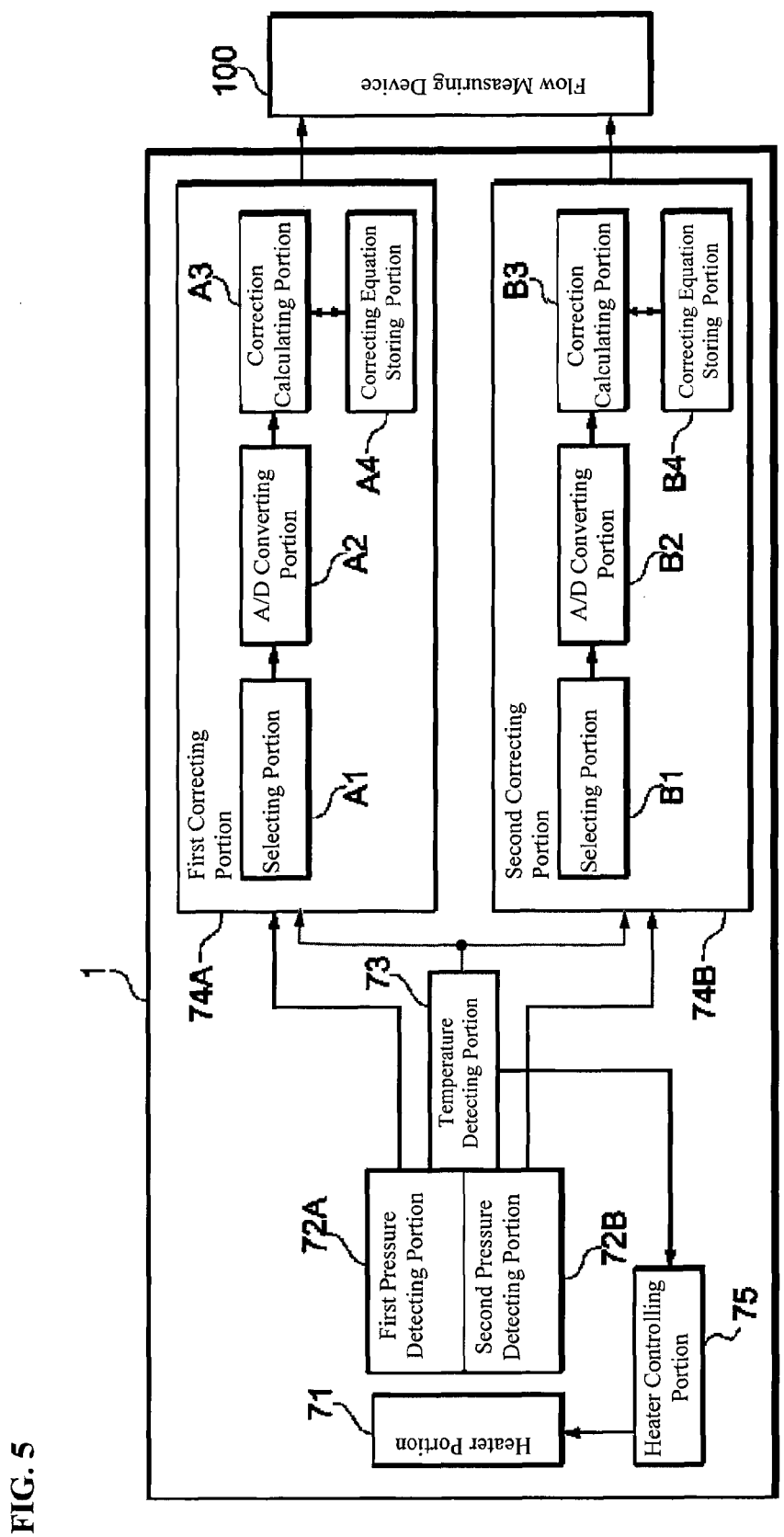
FIG. 5 is a functional structural diagram of the dual pressure sensor according to another modified example.

Additionally, while the amount of heat produced by the heater 5 is not controlled in the example set forth above, conversely the amount of heat produced by the heater 5 may be controlled through feedback through the use of a temperature detected by the temperature detecting portion 73, so as to maintain the temperature of the pressure sensors 3A and 3B at a specific temperature that is set in advance. The functional structure of the dual pressure sensor 1 in this example is illustrated in FIG. 5. As illustrated in FIG. 5, the dual pressure sensor 1 in this example differs from the dual pressure sensor 1 in the form of embodiment set forth above in the point that it further includes a heater controlling portion 75, in addition to the various portions illustrated in FIG. 3. The heater controlling portion 75 controls the amount of heat produced by the heater 5, so that the temperature detected by the temperature detecting portion 73 is a specific temperature set in advance. Doing so makes it possible to control the amount of heat produced by the heater 5 so that there is no increase in temperature that can damage the pressure sensors 3A and 3B, for example.

Figure 6:
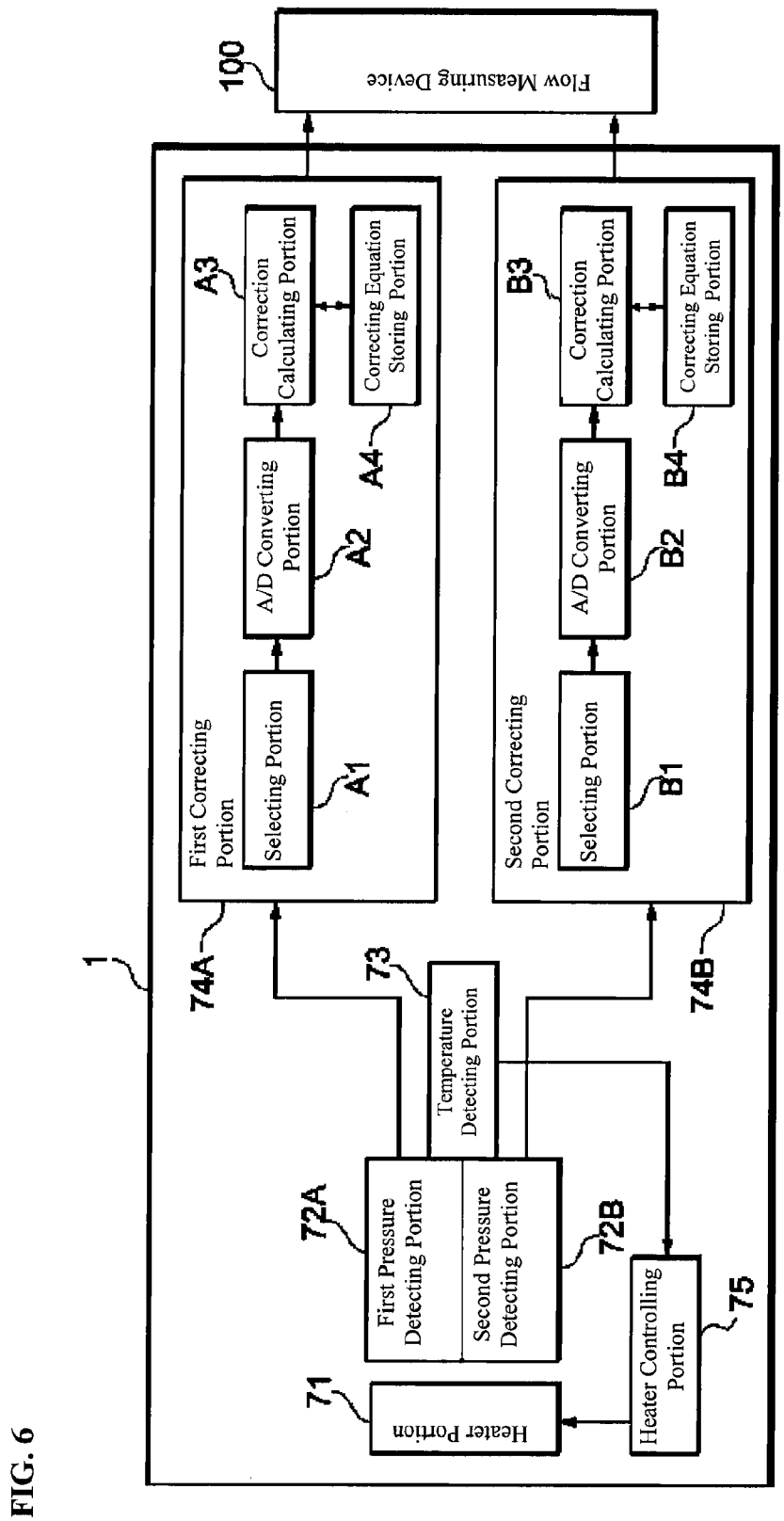
FIG. 6 is a functional structural diagram of the dual pressure sensor according to a further modified example.

When the amount of heat produced by the heater 5 is controlled through feedback in the example described above, the pressure sensors 3A and 3B are maintained at the specific temperature, with the result that the variables in the correcting equation used when correcting the pressure values of the pressure sensors 3A and 3B are also maintained at the specific temperature. Consequently, in this case, the correcting of the pressure value may be performed using a correcting equation wherein the variable is held constant at the specific temperature. The functional structure of the dual pressure sensor 1 in this example is illustrated in FIG. 6. As illustrated in FIG. 6, the dual pressure sensor 1 in this example differs from the dual pressure sensor 1 in the example set forth above in the point that it further includes the heater controlling portion 75 and the point that the detected temperature of the temperature detecting portion 73 is not inputted into the first correcting portion 74A and the second correcting portion 74B. The heater controlling portion 75 controls the amount of heat produced by the heater 5 so that the temperature effective by the temperature detecting portion 73 is the specific temperature that is set in advance, as was the case in the example set forth above. Moreover, the variables in the correcting equations stored in the correcting equation storing portions A4 and the B4 are set in advance to a specific temperature. Doing so makes it possible to simplify the correcting equation, making it possible to reduce the storage area for the correcting equation.

The invention claimed is:

1. A dual physical quantity sensor, comprising:
a first physical quantity detecting element detecting a physical quantity of a first object to be measured;
a second physical quantity detecting element detecting a physical quantity of a second object to be measured;
a temperature detecting element detecting the temperature of the first physical quantity detecting element and the second physical quantity detecting element;
a first correcting portion performing a correction that eliminates, from a detection signal from the first physical quantity detecting element, a fluctuation portion due to a change in temperature, to output a corrected signal as a measurement signal for the first object to be measured and;
a second correcting portion performing a correction that eliminates, from a detection signal from the second physical quantity detecting element, a fluctuation portion due to a change in temperature, to output a corrected signal as a measurement signal for the second object to be measured; wherein:
the temperature detecting element is integrated in mutual contact with the first physical quantity detecting element and the second physical quantity detecting element.

2. The dual physical quantity sensor as set forth in claim 1, further comprising:
a heat generating device causing the temperatures of the first physical quantity detecting element and the second physical quantity detecting element to be identical.

3. The dual physical quantity sensor as set forth in claim 1, further comprising:
a heat generation controlling portion for controlling the amount of heat generated by the heat generating device so that the detection temperature of the temperature detecting element goes to a specific temperature set in advance.

4. The dual physical quantity sensor as set forth in claim 1, wherein:
the first correcting portion and the second correcting portion perform corrections using the detected temperature of the temperature detecting element.

5. The dual physical quantity sensor device as set forth in claim 3, wherein:
the first correcting portion and the second correcting portion perform corrections using the specific temperature.

* * * * *